(12) United States Patent
Moshonas et al.

(10) Patent No.: US 6,539,934 B2
(45) Date of Patent: Apr. 1, 2003

(54) MULTICONVEYOR CONVECTION OVEN

(75) Inventors: Georges Moshonas, Montréal (CA); Chuck Czajka, Forest Hill, MD (US)

(73) Assignee: Zesto Food Equipment Manufacturing Inc., Montreal (CA)

( * ) Notice: Subject to any disclaimer, the term of this patent is extended or adjusted under 35 U.S.C. 154(b) by 0 days.

(21) Appl. No.: 10/045,008

(22) Filed: Jan. 15, 2002

(65) Prior Publication Data

US 2002/0134368 A1 Sep. 26, 2002

Related U.S. Application Data

(60) Provisional application No. 60/277,662, filed on Mar. 22, 2001.

(51) Int. Cl.$^7$ .............................. A21B 1/00; F24C 15/32
(52) U.S. Cl. ................. 126/21 A; 126/21 R; 99/443 C; 34/216; 432/145; 432/152
(58) Field of Search ............................. 126/21 A, 15 A, 126/21 R, 19 R, 15 R, 19 A; 219/388, 400; 99/443 C, 475, 476, 477, 386; 34/216, 217, 225, 203–208; 432/145, 152, 136

(56) References Cited

U.S. PATENT DOCUMENTS

| 4,462,383 A | 7/1984 | Henke et al. |
| 4,753,215 A | 6/1988 | Kaminski et al. |
| 4,884,552 A | * 12/1989 | Wells et al. ............... 126/21 R |
| 4,965,435 A | 10/1990 | Smith et al. |
| 5,277,105 A | * 1/1994 | Bruno ....................... 126/21 A |
| 5,423,248 A | 6/1995 | Smith et al. |
| 5,584,237 A | 12/1996 | Moshonas |
| 5,832,812 A | 11/1998 | Wolfe et al. |
| 6,192,877 B1 | 2/2001 | Moshonas et al. |

* cited by examiner

Primary Examiner—James C. Yeung
(74) Attorney, Agent, or Firm—McDermott, Will & Emery

(57) ABSTRACT

The multiconveyor convection oven comprises a baking chamber, at least two spaced-apart conveyors mounted transversally one over the other in the baking chamber, a heating chamber behind the baking chamber. A convection system is provided for allowing a circulation of the air from the baking chamber to the heating chamber and back to the baking chamber to cook the food. The convection system comprises air return passages providing a fluid communication between the baking chamber and the heating chamber, a blower housing extending vertically outside the heating chamber on a side thereof, at least two centrifugal blower chambers, one for each conveyor, mounted one over the other within the blower housing. Each centrifugal blower chamber has an air inlet in fluid communication with the heating chamber for drawing air from the baking chamber and an air outlet for throwing back heated air at high pressure. The convection system also includes plenum chambers and ducting means disposed within the baking chamber for conveying the heated air at high pressure exiting from the plenum and dispensing the same in the baking chamber to cook food.

21 Claims, 17 Drawing Sheets

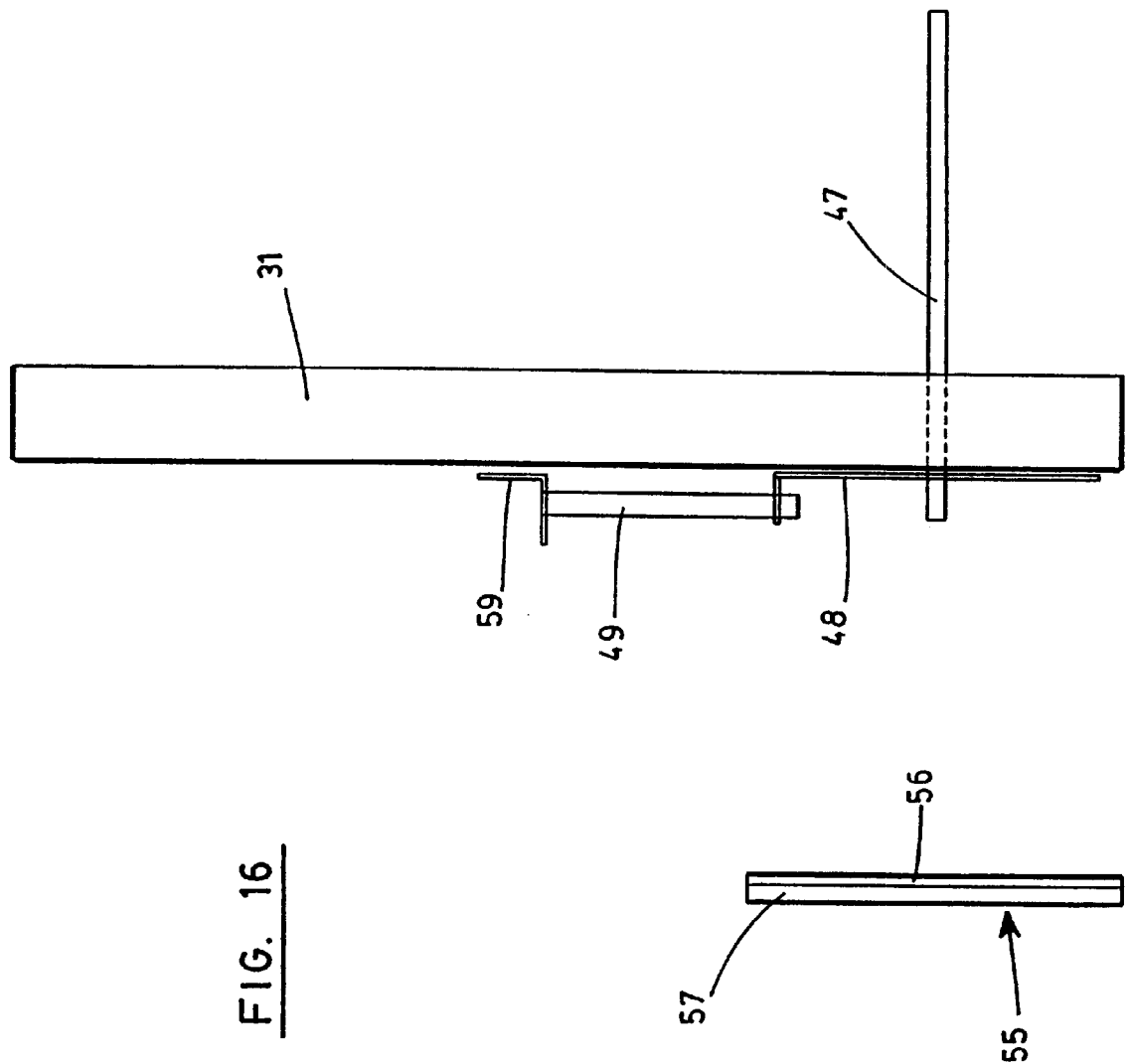

MULTICONVEYOR CONVECTION OVEN

RELATED APPLICATIONS

This application claims priority from U.S. Provisional Patent Application No. 60/277,662, filed Mar. 22, 2001.

FIELD OF THE INVENTION

The present invention relates in general to the field of convection ovens that cook food by impingement. More particularly, it concerns a multiconveyor convection oven with an improved heating chamber.

BACKGROUND OF THE INVENTION

Impingement food ovens are mostly used in fast food restauration for rapidly cooking food such as pizzas, pre-cooked meals, sea food souffles, cookies cooking etc., by air streams which impinge against the surface of the food products. Most of such ovens presently in use comprise an air distribution system including one or more air distribution channels located in a baking chamber and one or more blowers for drawing air from the baking chamber and recycling the air at different locations within the same via the air distribution chambers. These ovens also comprise a single conveyor mounted in the baking chamber for carrying food products into, through and out of the cabinet.

Examples of prior art impingement food ovens of this type are described by way of example in U.S. Pat. Nos. 5,584,237 in the name of the applicant; 5,423,248; 4,965,435; 4,462,383; 4,753,215; and 6,192,877.

For the last recent years, a need has developed for more productive multiconveyor impingement ovens. Already known in the prior art, there is U.S. Pat. No. 5,832,812 in the name of Wolfe which discloses a low profile dual conveyor oven including an oven cabinet with two closely spaced conveyors and an air heating and circulation system designed so that the oven has a limited vertical dimension.

SUMMARY OF THE INVENTION

An object of the present invention is to propose an improved impingement oven with more than one conveyor.

According to the present invention, that object is achieved with a multiconveyor convection oven, comprising:
 a baking chamber
 at least two spaced-apart conveyors mounted transversally one over the other in the baking chamber;
 a heating chamber behind the baking chamber, the heating chamber comprising an air heater to heat air circulating in the heating chamber;
 a convection system for providing a circulation of the air from the baking chamber to the heating chamber and back to the baking chamber to cook the food, the convection system comprising:
  at least one air return passage having an air inlet in fluid communication with the baking chamber and an air outlet in fluid communication with the heating chamber;
  a blower housing extending vertically outside the heating chamber on a side thereof;
  at least two centrifugal blower chambers, one for each conveyor, mounted one over the other within the blower housing, each centrifugal blower chamber having:
   an air inlet in fluid communication with the heating chamber for drawing air from the baking chamber via the at least one air return chamber and the heating chamber and
   an air outlet for throwing back heated air at high pressure;
  at least two plenum chambers, one downstream from each centrifugal blower chamber, disposed one over the other in between the baking chamber and the heating chamber, each plenum chamber having:
   an air inlet in fluid communication with the air outlet of a corresponding one of the centrifugal blower chambers for receiving the heated air at high pressure ; and
   at least one air outlet for throwing back the heated air;
  ducting means disposed within the baking chamber for conveying the heated air at high pressure exiting from the at least one outlet of the plenum and dispensing the same in the baking chamber to cook food.

Preferably, the multiconveyor convection oven comprises two spaced-apart conveyors mounted transversally one over the other in the baking chamber.

As can be appreciated, the use of a blower housing extending vertically on a side of the oven rather than a blower housing extending horizontally behind the baking chamber as disclosed in U.S. Pat. No. 5,832,812, presents many advantages. Among other things, it makes it possible to build relatively easily a multiconveyor oven with more that two conveyors mounted one over the other. It also allows to free the space of the heating chamber thereby allowing, in a preferred embodiment of the invention, the installation of an efficient system for controlling the distribution of the heat within the baking chamber.

According to another aspect, the present invention also provides a multiconveyor convection oven, comprising:
 a baking chamber;
 two spaced-apart conveyors mounted transversally one over the other in the baking chamber;
 a heating chamber behind the baking chamber, the heating chamber comprising a burner disposed in a bottom portion of the heating chamber and capable of releasing a gas jet to heat air circulating in the heating chamber;
 a convection system for providing a circulation of the air from the baking chamber to the heating chamber and back to the baking chamber to cook the food, the convection system comprising:
  at least one air return passage having an air inlet in fluid communication with the baking chamber and an air outlet in fluid communication with the heating chamber;
  two blower housings extending vertically outside the heating chamber, one extending on a first side of the oven and the other one extending on a second side of the oven opposite the first side;
  two centrifugal blower chambers mounted one over the other within each of said two blower housings, each centrifugal blower chamber having:
   an air inlet in fluid communication with the heating chamber for drawing air from the baking chamber via the at least one air return chamber and the heating chamber; and
   an air outlet for throwing back heated air at high pressure;
  a first set of two plenum chambers, one plenum chamber being downstream from each centrifugal blower chamber mounted in one of the two blower housings, the two plenum chambers being disposed one over the other in between the baking chamber and the heating chamber;

a second set of two plenum chambers, one plenum chamber being downstream from each centrifugal blower chamber mounted in the other one of the two blower housings, the two plenum chambers being disposed one over the other in between the baking chamber and the heating chamber;

each of the plenum chambers of the first and second set having:
   an air inlet in open communication with the air outlet of a corresponding one of the centrifugal blower chambers for receiving the heated air at high pressure; and
   air outlets for throwing back the heated air;

a set of parallel finger ducts disposed over and below each of the two conveyors, each finger duct having an air inlet connectable to a corresponding one of the air outlets of the plenum chambers to receive the heated air therefrom and a plurality of air outlets to dispense the heated air in the baking chamber; and control means for controlling the distribution of the heated air dispensed in the baking chamber, the control means comprising:
   a substantially transversal deflector mounted transversally within the heating chamber above the burner for controlling the distribution of the heat within the heating chamber between the bottom portion and the top portion of the heating chamber, the transversal deflector comprising:
      an upwardly curved middle section; and
      at least one planar section connectable to each end of the middle section to transversally expand the deflector; and
   a substantially vertical deflector mounted vertically within the heating chamber and facing the burner, and capable of controlling the distribution of the heat within the heating chamber between the first side and the second side thereof.

BRIEF DESCRIPTION OF THE DRAWINGS

FIG. 16 is a side view of the back panel showing, in a partly exploded view, one of the means that can be used for moving the transversal deflector.

DESCRIPTION OF A PREFERRED EMBODIMENT

To simplify the figures, some elements are not referred to in some figures if they were already identified in a precedent figure, and the same numeral references are used for indicating different variants of an element.

Figure 1:
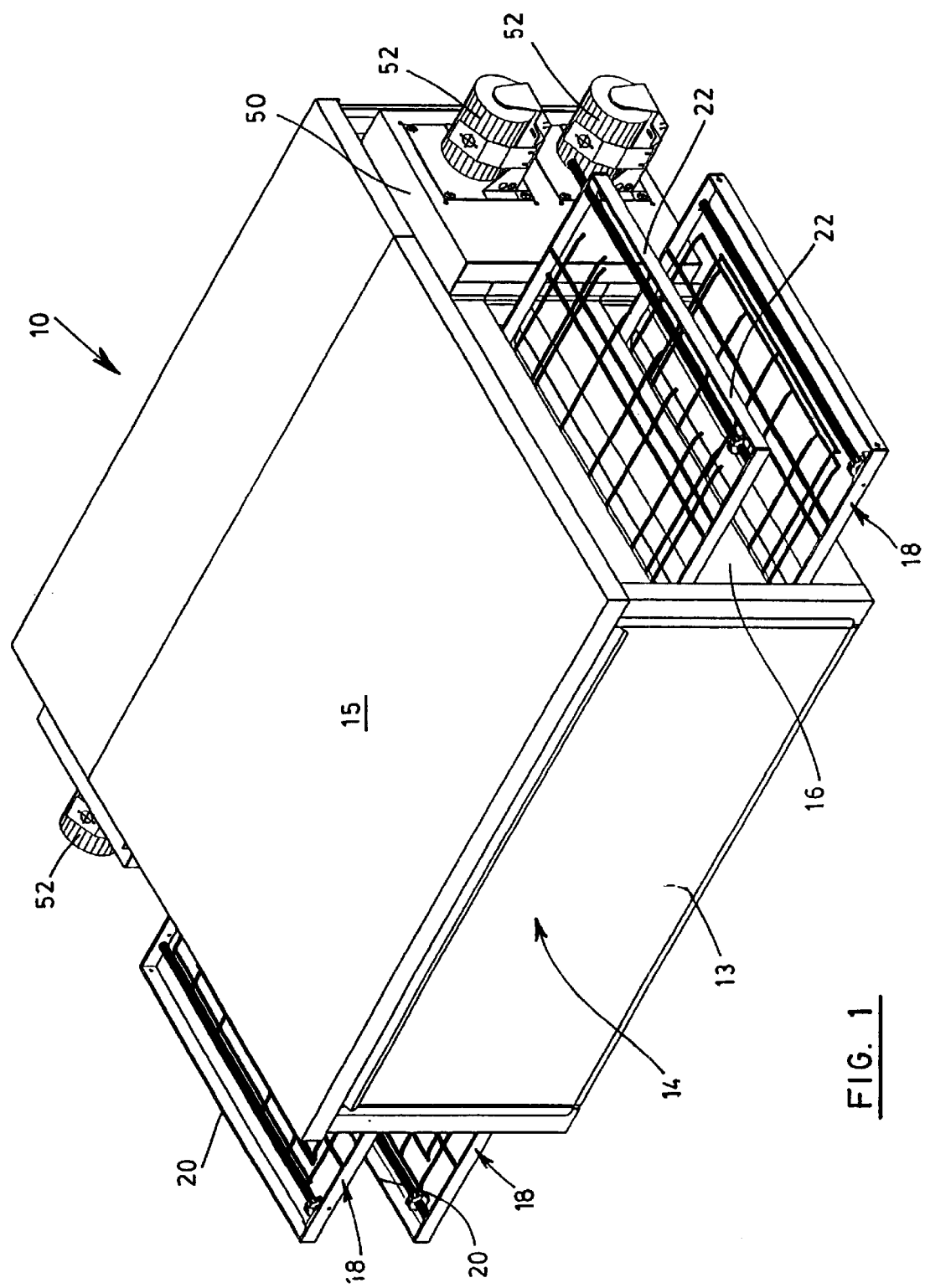
FIG. 1 is a perspective view of a multiconveyor convection oven according to a preferred embodiment of the invention viewed from the front.
Figure 2:
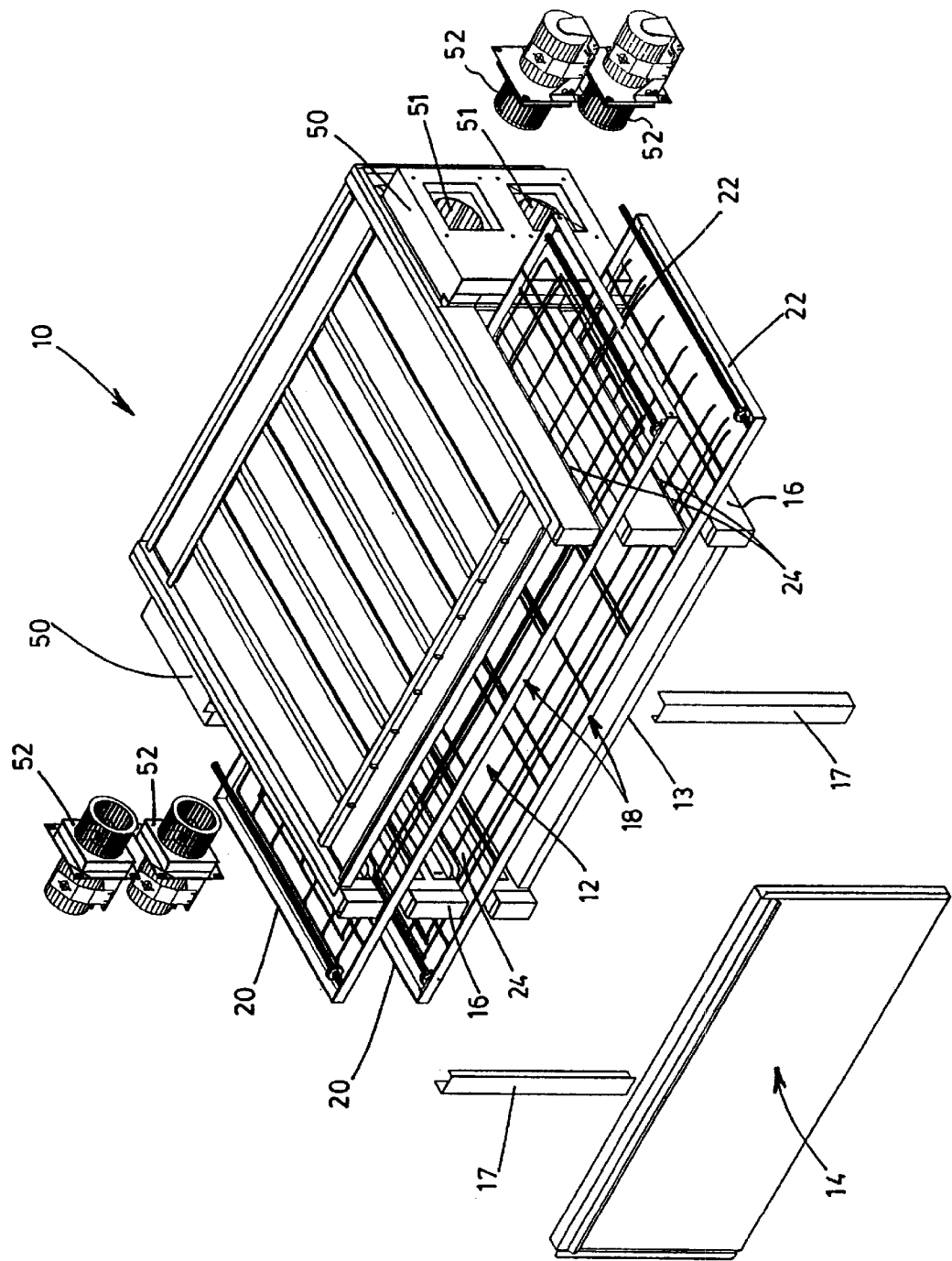
FIG. 2 is the same view as FIG. 1, showing the oven with portions shown in exploded view and with the top panel and the sets of finger ducts removed.
Figure 3:
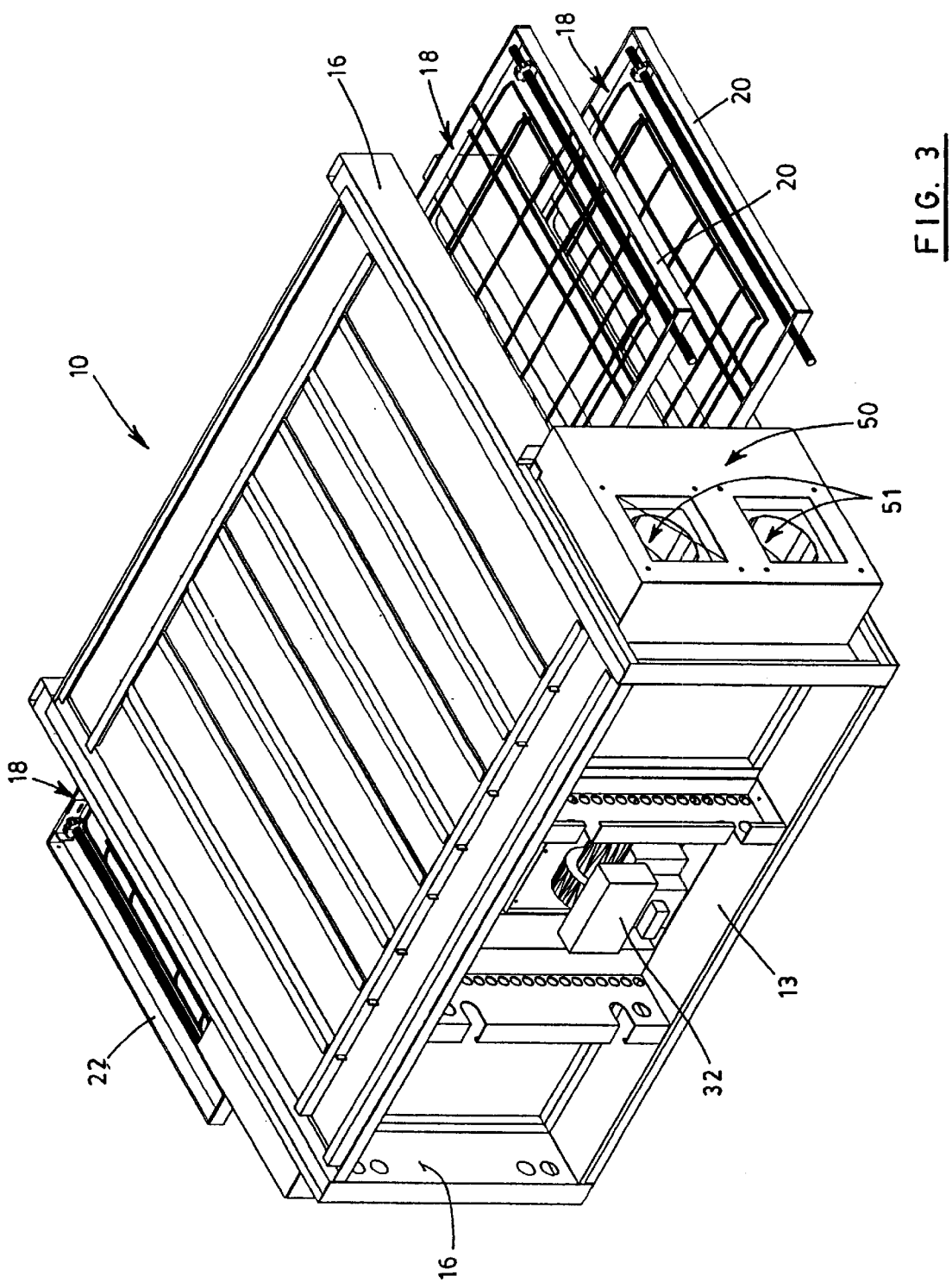
FIG. 3 is another perspective view of the oven of FIG. 1 viewed from the back, and with the front door and top panel removed.

Referring to FIGS. 1 to 3, the multiconveyor convection oven (10) according to a preferred embodiment of the invention, used for example for cooking food by impingement, comprises a baking chamber (12) with a removable front door (14), a top wall (15), a bottom wall (13), and two opposite side walls (16). The front door (14) is preferably hinged to the bottom wall (13). Any conventional hinged means known in the art can be used. Two spaced-apart conveyors (18) are mounted transversally in the baking chamber (12) one over the other. Each conveyor (18) has a feeding end (20) and a delivering end (22) coming out of the baking chamber (12) through openings (24) in the side walls (16) so to convey food in the baking chamber (12) from one side and out through the other side of the baking chamber (12). It is worth noting that the invention is not limited to a dual conveyor convection oven. Indeed another embodiment of the invention, not illustrated, may include more than two conveyors mounted one over the other, and that without departing from the scope of the invention.

Figure 4:
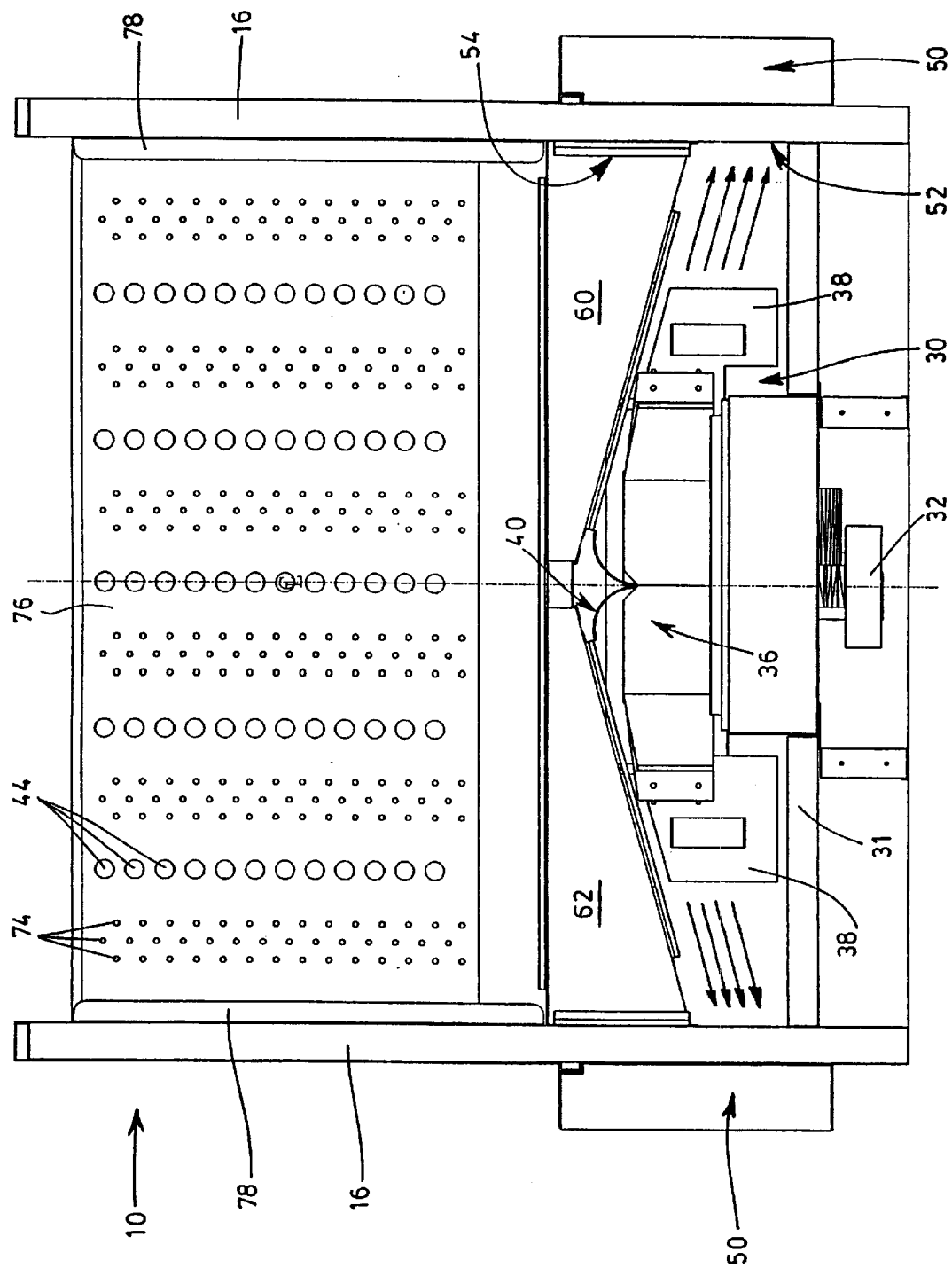
FIG. 4 is a top view of the oven of FIG. 1 shown without the top panel.
Figure 5:
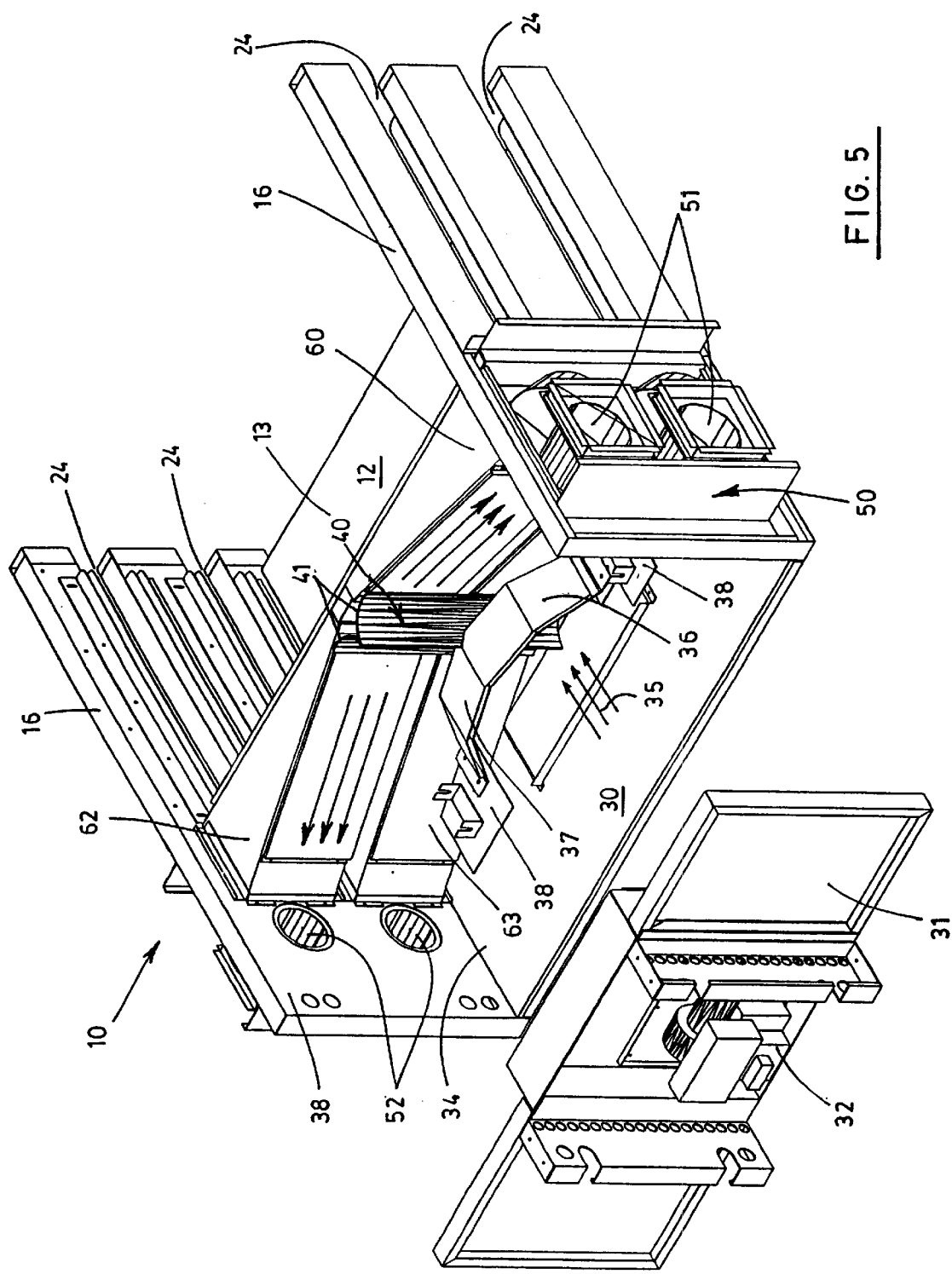
FIG. 5 is another perspective view of the oven of FIG. 1 viewed from the back without the front door, the top wall, the conveyors and the finger ducts, and showing more specifically the heating chamber with its back panel open.

The oven (10) further generally includes a heating chamber (30), as shown for example in FIGS. 4 and 5, a convection system for providing a circulation of the air from the baking chamber (12) to the heating chamber (30) and back to the baking chamber (12) to cook the food. The oven (10) further preferably comprises a control means for controlling the distribution of the heated air dispensed in the baking chamber (12). Each of these elements will now be described in more details.

Turning to FIGS. 4 and 5, the heating chamber (30) is located at the back of the oven (10), behind the baking chamber (12) and it is in open communication with the same. The heating chamber is circumscribed by a back panel (31), portions of the side walls (16) of the oven and the plenum chambers (60,62,63 and 64) that will be described hereinafter. The heating chamber (30) comprises a source of heat, preferably a burner (32) mounted on the back panel and capable of propelling an intense flame, as shown in FIG. 4. The burner (32) is located in a bottom section of the heating chamber (30).

Figure 6:
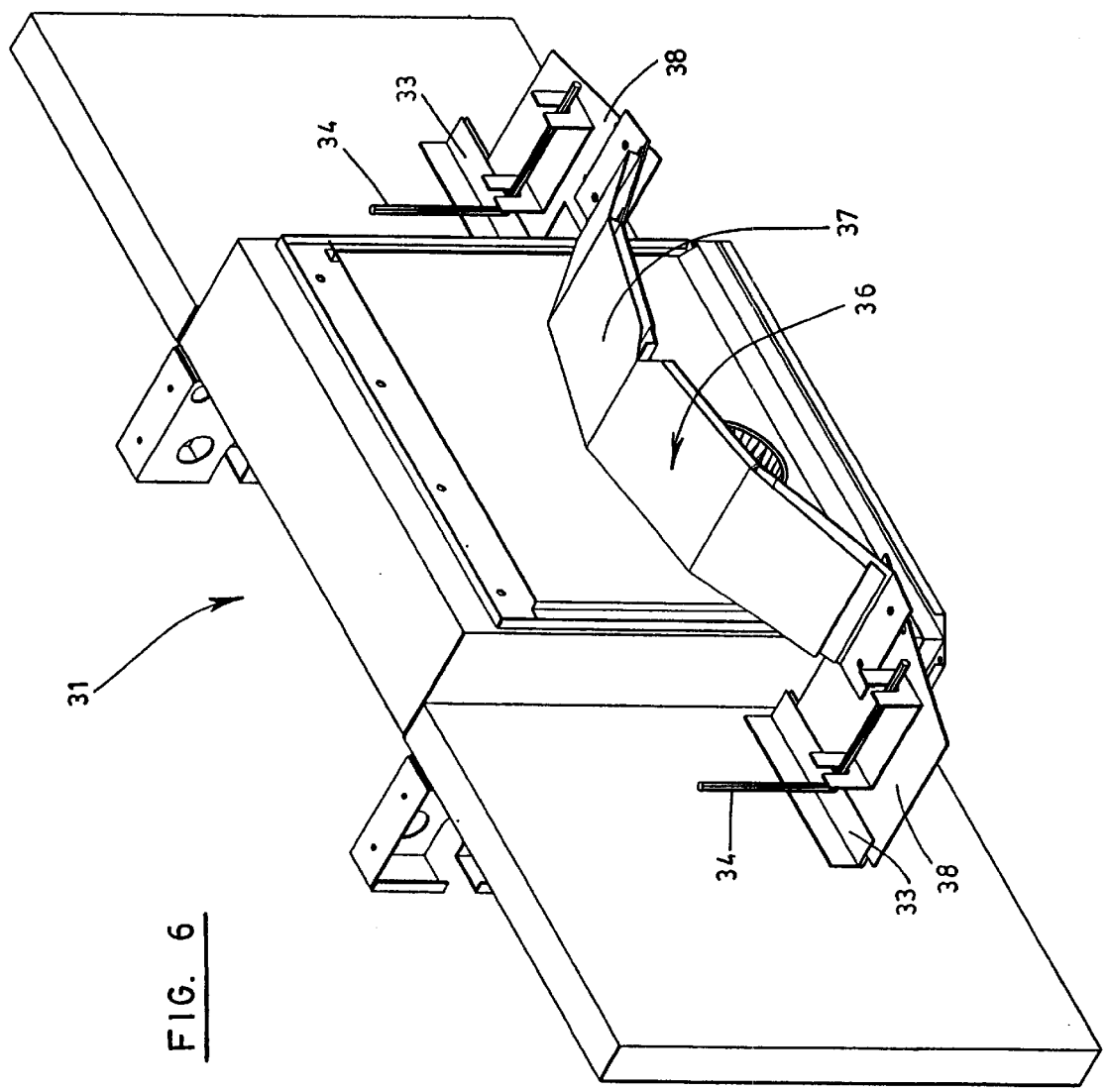
FIG. 6 is a perspective view of the back panel of the heating chamber showing how the transversal deflector is mounted thereon.
Figure 7:
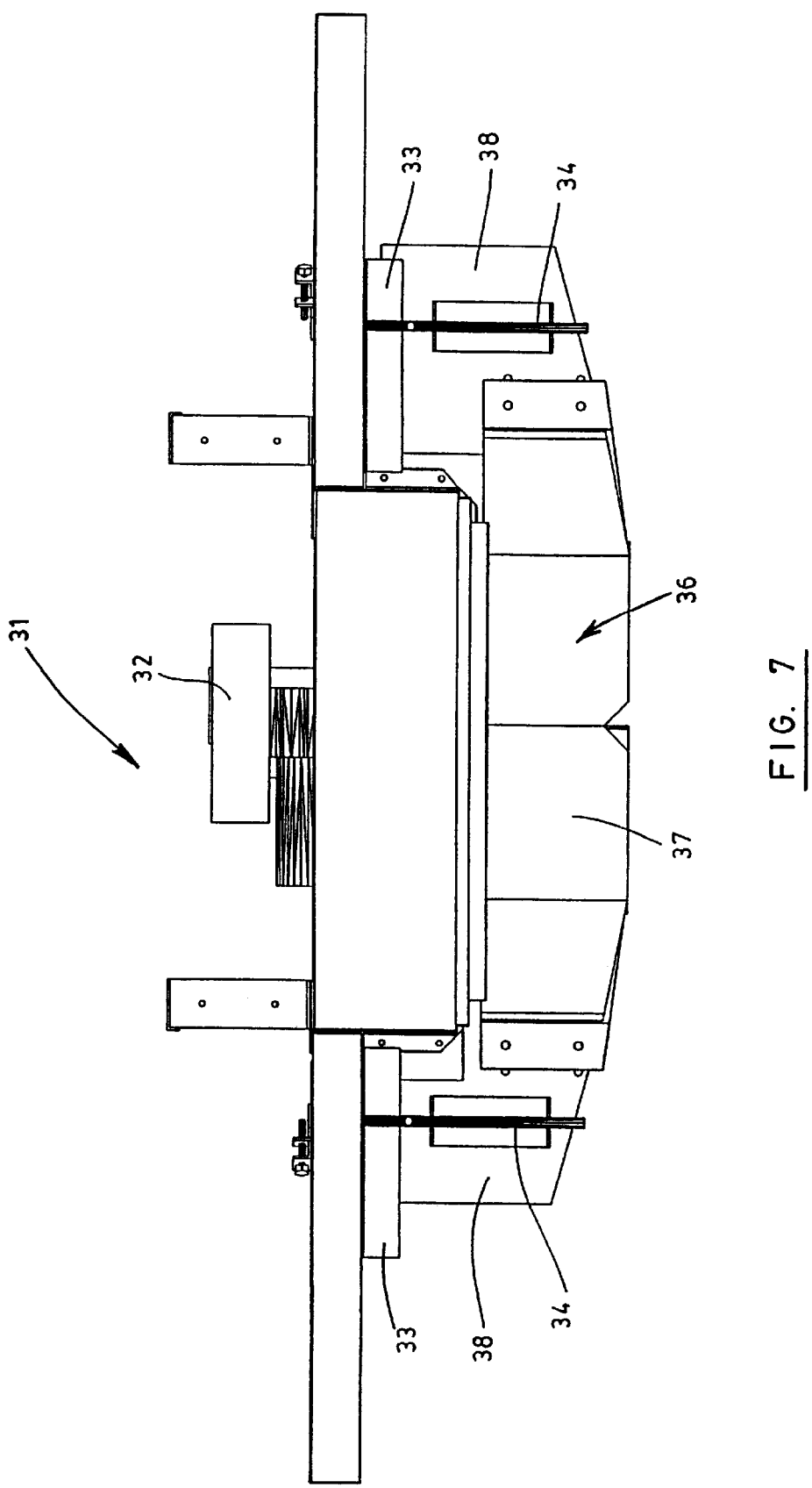
FIG. 7 is a top view of the back panel shown in FIG. 6.

The heating chamber (30) further comprises means for controlling the distribution of the heat within the heating chamber (30), and thus within the baking chamber (12). Referring now also to FIGS. 6 and 7, the controlling means preferably comprises a deflector (36), extending transversally over the burner (32). More preferably, the deflector (36) is positioned just over the position where the flame (35) of the burner is propelled so to limit the displacement of the heated air towards the upper position (38) of the heating chamber (30). The deflector (36) thus helps controlling the distribution of the heated air between the bottom portion and the upper portion of the heating chamber (30). It may take any shape as long as it is extending transversally over the burner (32). For example, it could take the shape of a planar plate. However, in the preferred embodiments illustrated, the deflector (36) is an arc-shaped metallic plate domed towards the top. The deflector (36) is preferably adjustable. In that case, and according to a first preferred variant illustrated in FIGS. 4 to 7, it comprises an arc-shaped middle section (37) and at least one adjustable planar section (38) connectable to each end of the middle section (37) to transversally expand the deflector (36). One or more planar sections (38) may be added at each end of the middle section (37) for providing an horizontal adjustment, depending on the distribution of the heat required within the heating chamber (12). Most preferably, the arc-shaped middle section (37) is a double ply metallic plate.

In the first preferred embodiment shown in FIGS. 4 to 7, the transversal deflector (36) comprises a horizontally slidable planar section (38) at each end of the middle section (37). Each planar section (38) has a back edge slidably mounted in a guideway (33) secured to the back panel (31), as best seen in FIG. 6. A hand lever (34), preferably in the form of a L-shaped rod, is provided for adjusting each planar section (38) from the outside. The hand lever (34) has a first end secured to the planar section (38) and a second end projecting out from the back panel (31). The adjustment can be performed by manipulating the second end of the hand lever (34).

Figure 14:
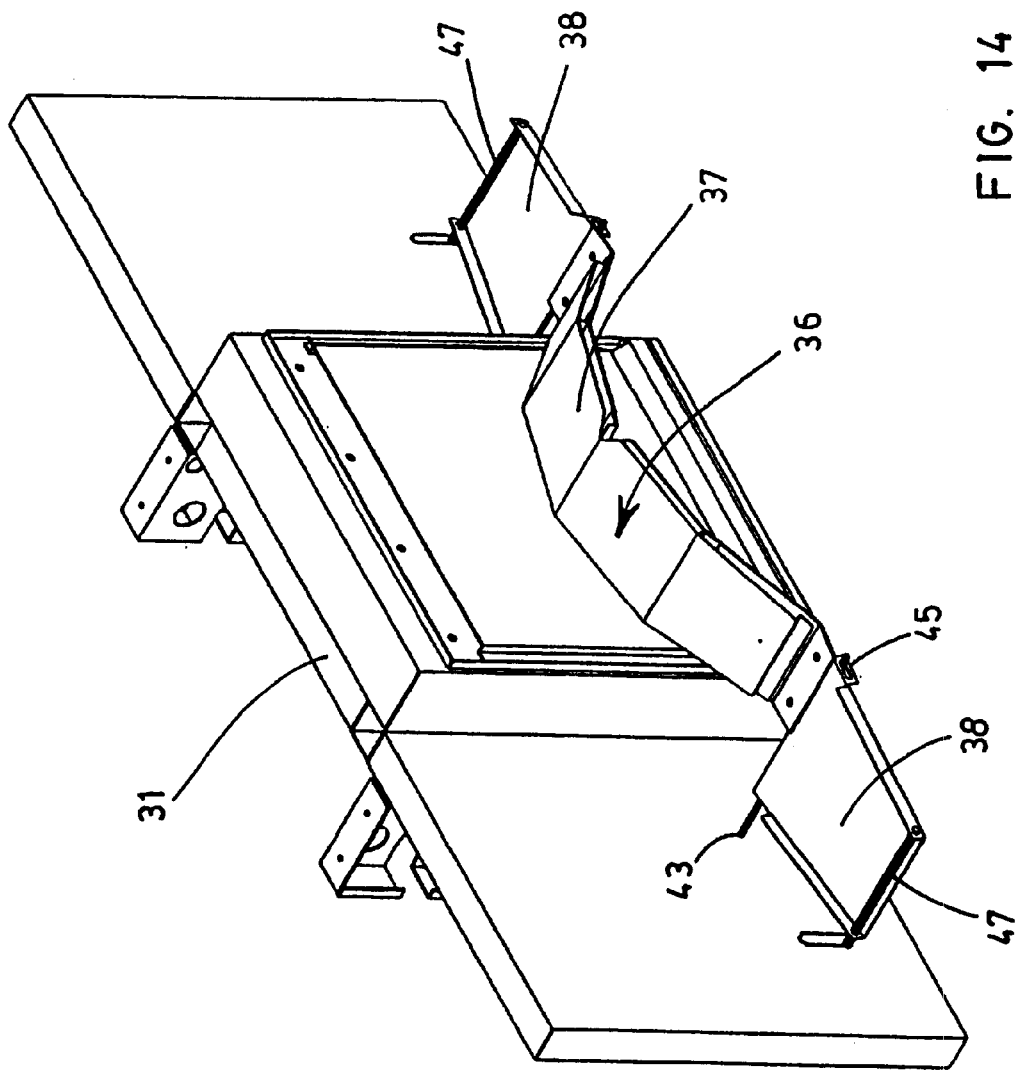
FIG. 14 is a perspective view of the back panel of the heating chamber of the oven shown in FIG. 12 showing how the transversal deflector is mounted thereon.
Figure 15:
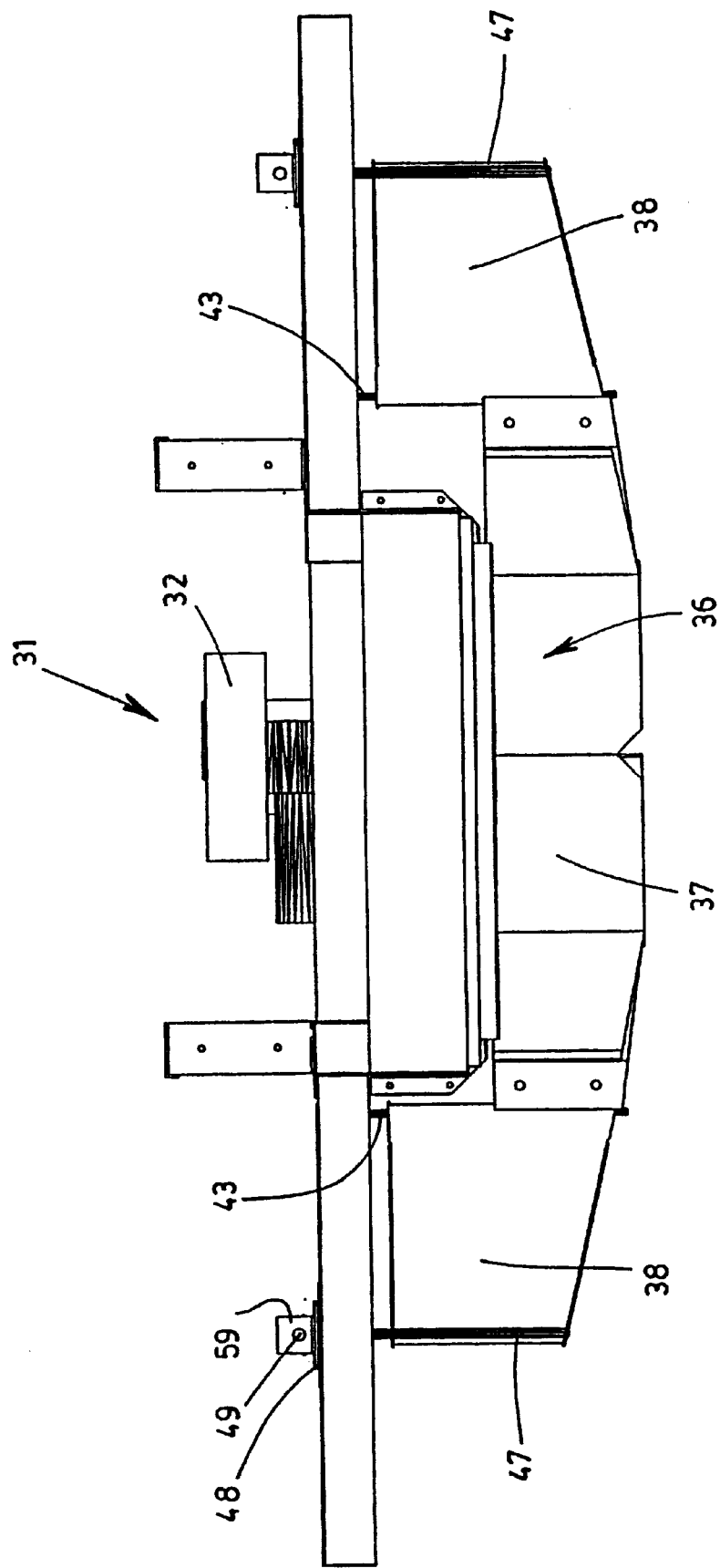
FIG. 15 is a top view of the back panel shown in FIG. 14.
Figure 18:
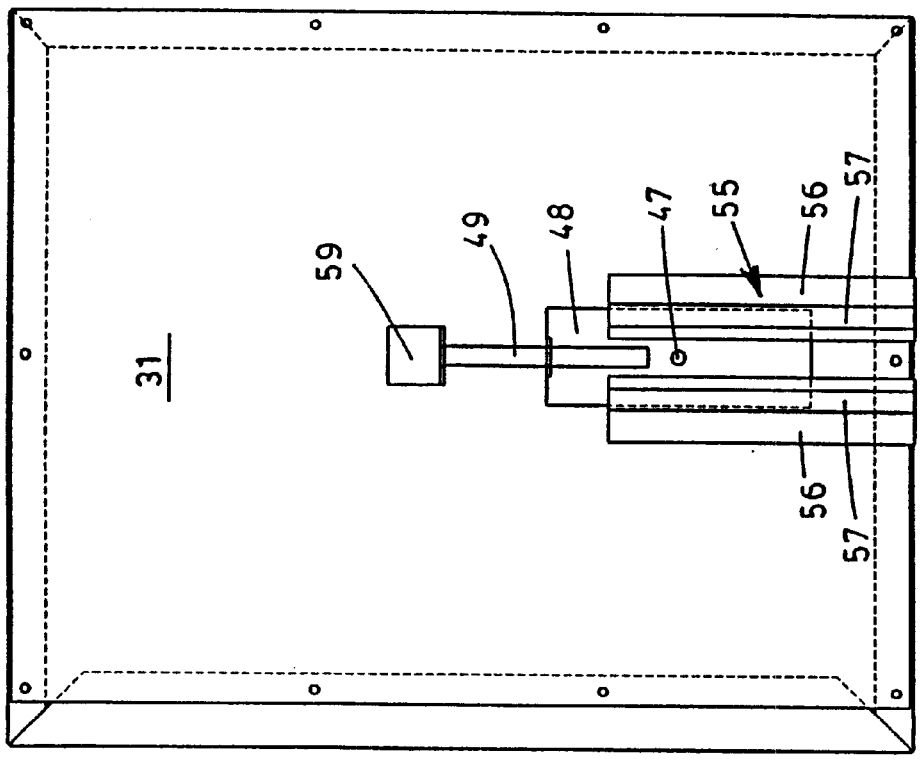
FIG. 18 is the same view as in FIG. 17, showing the sliding plate in an upper position.
Figure 17:
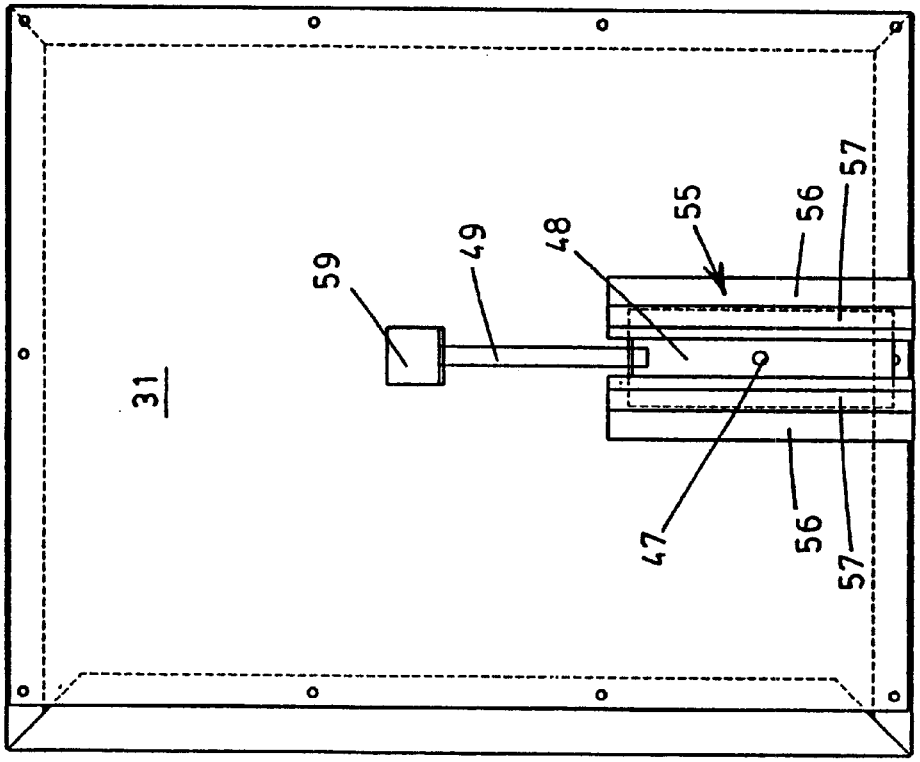
FIG. 17 is a back view of the back panel of FIG. 16 showing the sliding plate of the means for moving the transversal deflector in a lower position.

In a second preferred embodiment of the invention shown in FIGS. 12 to 18, the transversal deflector (36) comprises a pivotable planar section (38) at each end of the middle section (37). (As best seen in FIGS. 14 and 15). Each planar section (38) has two opposite side edges, one being hinged to an end of the middle section (37) by means of a pivot rod (43), the pivot rod having an end secured to the back panel (31). The body of the pivot rod (43) extends preferably in a transversal slot (45) provided at the side edge of the planar section (38) thereby allowing slight transversal movements of the planar section (38). Another rod (47) is transversally mounted to the other side edge of the planar section (38). A mechanism is provided for moving the rod (47) between a lower and an upper position to thereby adjust the pivotable planar section (38). Referring now more particularly to FIGS. 16 to 18, this mechanism preferably comprises a vertically sliding plate (48) extending on the outer face of the back panel (31) and to which an end of the rod (47) is secured. That end is preferably welded to the plate (48). The mechanism further comprises means for moving the plate (48) between the upper and lower position. This mechanism preferably comprises an adjustment screw (49) mounted to the back panel (31) above the plate (48) by means of a bracket (59). Although, not clearly illustrated, one will understand that the bracket (59) is secured to the back wall (31) by means of a screw or any other appropriate means. The adjustment screw (49) has a bottom end connected to an uppermost flange of the plate (48). The set plate (48) is set against the back panel (31) by means of a runner element (55) secured to the back panel (31). The runner element (55) has two flanges (56) secured to the back panel (31) and a guiding rail (57) in between the flanges (56) for receiving the movable plate (48) and in which the same is capable of sliding vertically. The runner element (55) is preferably formed from two identical pieces as best shown in FIGS. 17 and 18.

In the preferred embodiment illustrated, the means for controlling the distribution of heat further comprises a substantially vertical flame deflector (40) mounted vertically within the heating chamber (30) and positioned so to face the burner (32). The vertical deflector (40) is shaped so to be capable of controlling the distribution of the heat within the heating chamber (30) between both sides of the heating chamber (30). As best shown in FIGS. 4 and 5, the vertical deflector (40), which comprises two jointed and vertically elongated curved sections (41), is adapted to split the flow of heat from the flame and, thanks to the curved sections (41), to direct a flow of heat on both sides of the heating chamber (30).

As mentioned hereinabove, the oven (10) further comprises a convection system for providing a circulation of air in the oven so that heated air is injected in the baking chamber (12) to cook the food. The air is then recirculated to be heated before being reinjected in the baking chamber (12).

Figure 9:
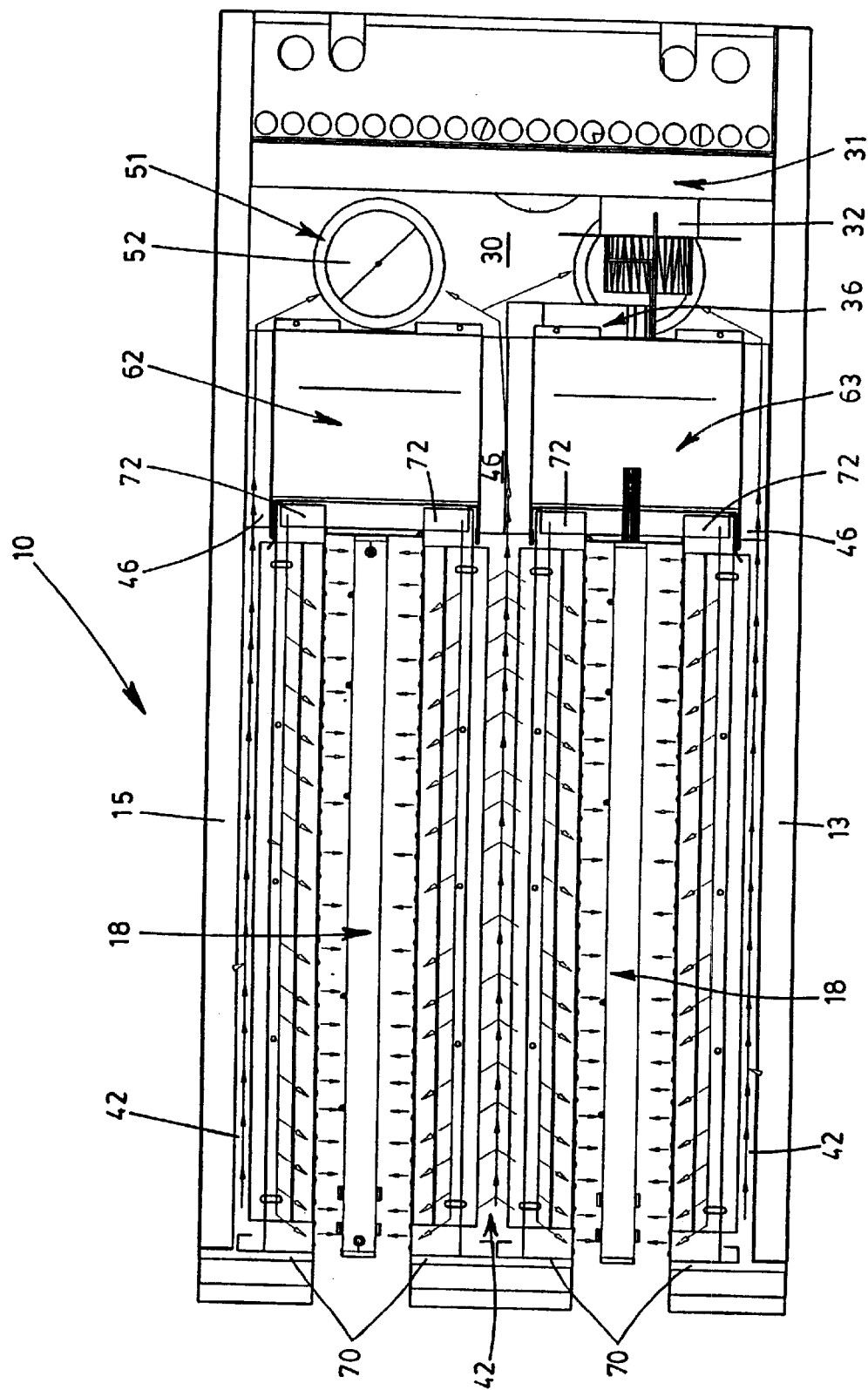
FIG. 9 is a cross-sectional side view of the oven of FIG. 1 showing the circulation of air within the baking chamber.
Figure 10:
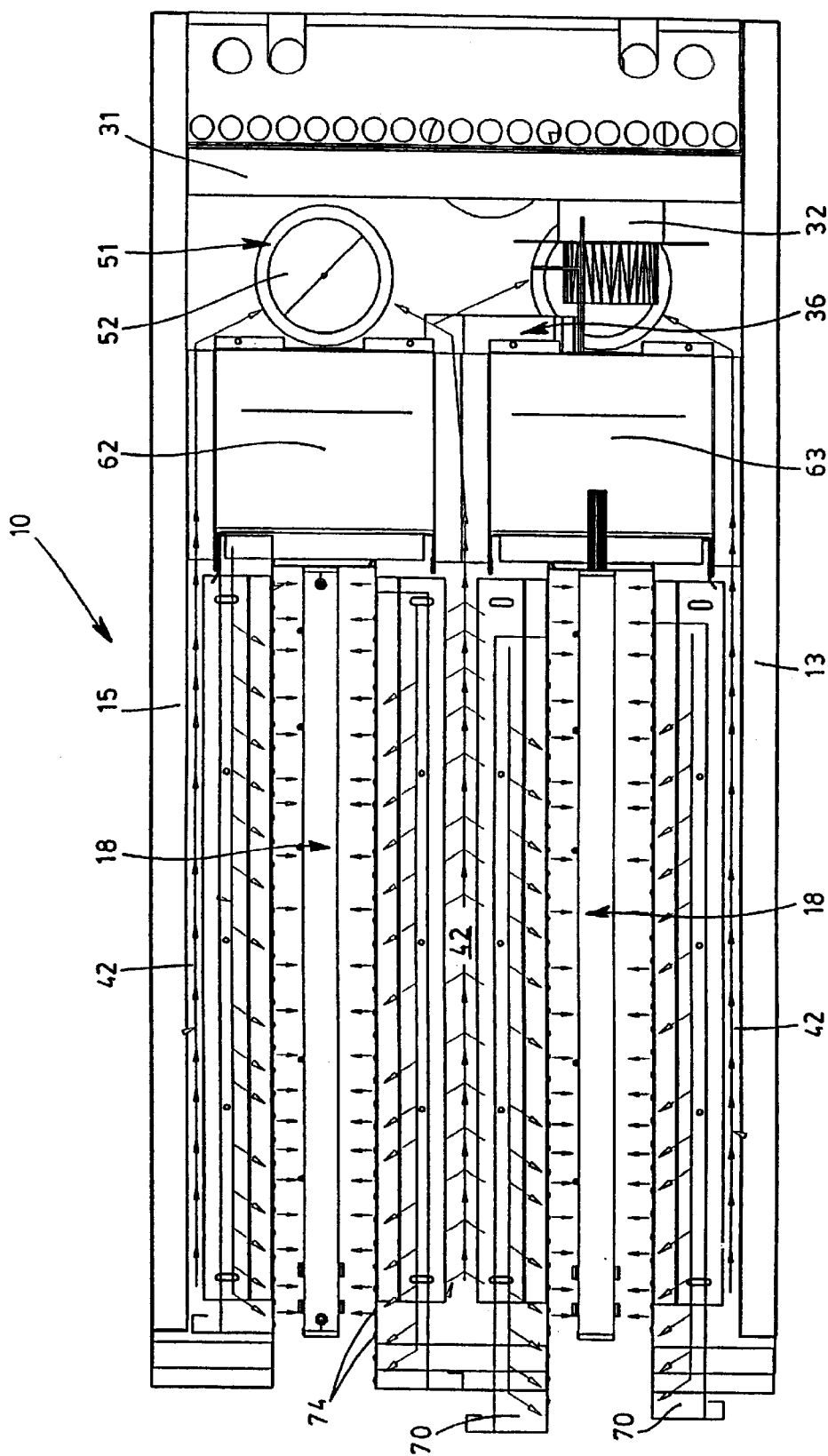
FIG. 10 is the same view as FIG. 9 showing the two lower blown air distributor trays slightly slid out of the baking chamber.
Figure 11:
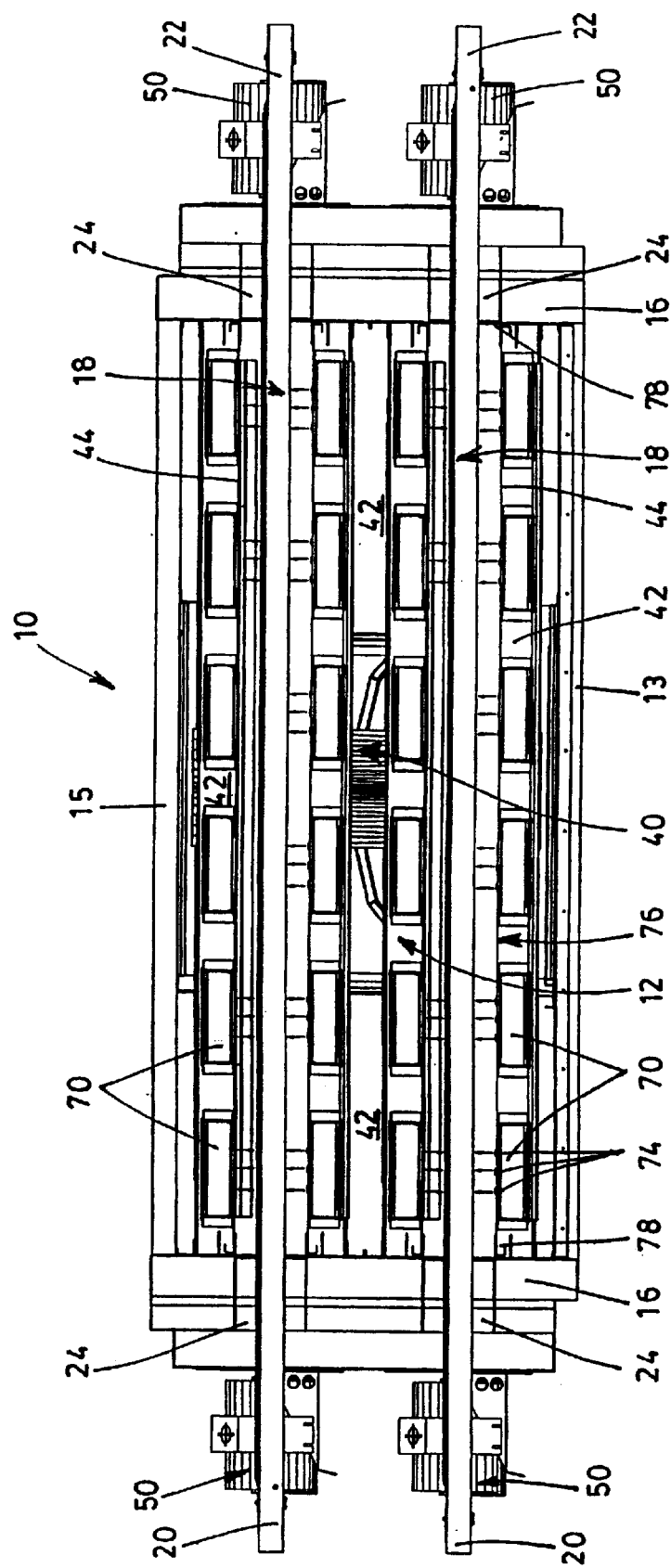
FIG. 11 is a front view of the oven of FIG. 1 without the front door.
Figure 12:
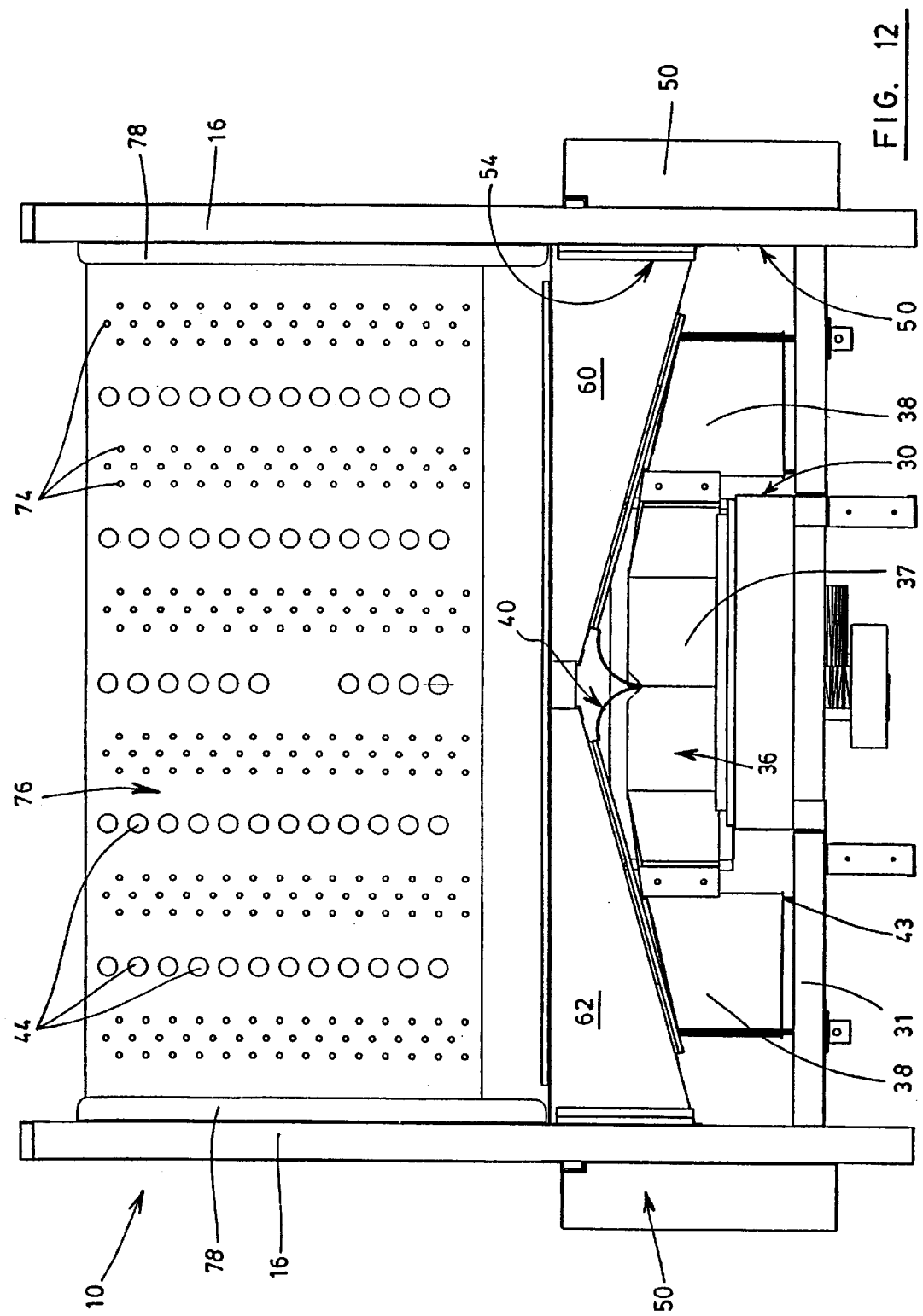
FIG. 12 is the same view as FIG. 4, showing a variant of a transversal deflector that can be used in an oven according the invention.
Figure 13:
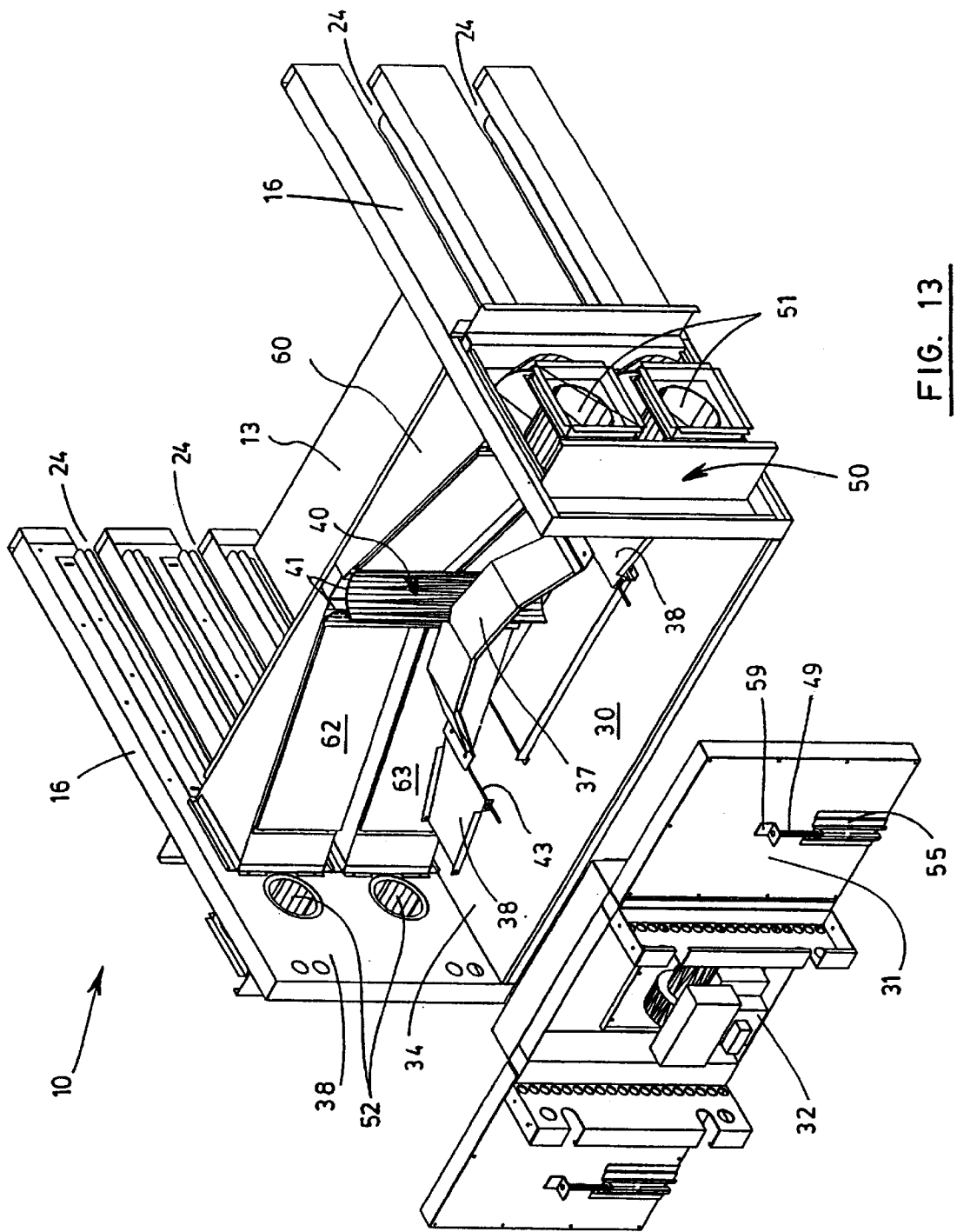
FIG. 13 is a view of the oven of FIG. 12 similar to FIG. 5.

Referring to FIGS. 9 to 11, the convection system comprises air return passages (42), one over and one below each conveyor (18). As can be appreciated, in the preferred embodiment, the two conveyors (18) are sharing the air return passage (42) located between the two conveyors (18). Each air passage (42) has air inlets (44), as shown in FIGS. 4 and 11, in open communication with the baking chamber (12) and air outlets (46) in open communication with the heating chamber (30).

Figure 8:
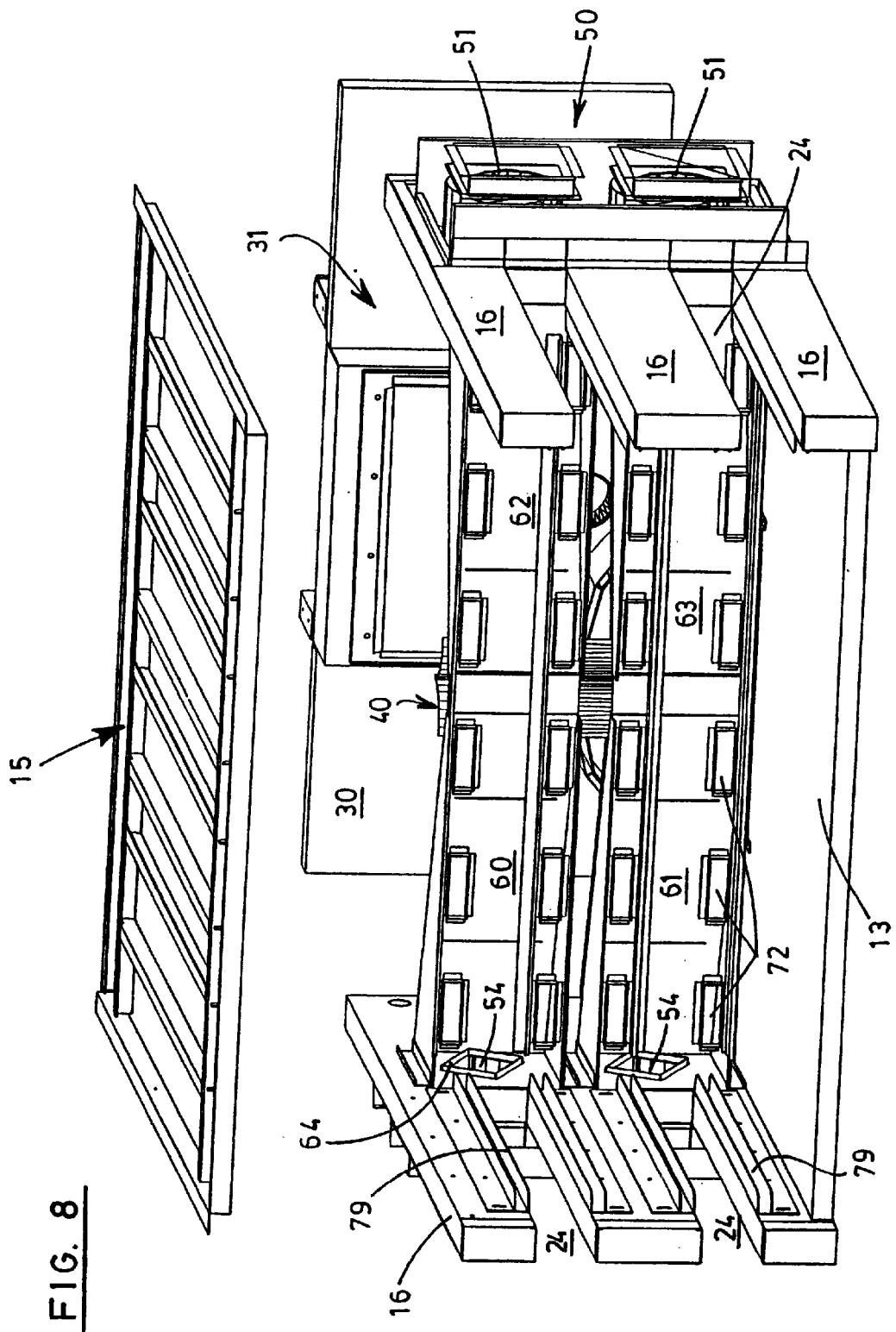
FIG. 8 is a perspective partly exploded view of the oven of FIG. 1 viewed from the front, and shown without the front panel, the conveyors and the finger ducts.

The convection system further comprises two blower housings (50) extending vertically outside the heating chamber (30), one extending on a first side of the oven (10) and the other one extending on a second side of the oven (10) opposite the first side, as best viewed from FIG. 4. In FIGS. 5 and 8, the side panel of the housing has been removed to better see the interior of the housing (50). Two centrifugal blower chambers (51) are mounted one over the other within each of the two blower housings (50). It is worth mentioning that in the case where the oven (10) would comprise more than two conveyors (18) mounted one over the other, a blower chamber (51) would be provided in the blower housing (50) for each conveyor (18). For example, if the oven (10) would comprise three conveyors (18), three blower chambers (51) would be mounted one over the other in each blower housing (50) without departing from the scope of the present invention.

Each centrifugal blower chamber (51) has an air inlet (52) in fluid communication with the heating chamber (30) for drawing air from the baking chamber (12) via the air return passages (42) and the heating chamber (30). Each centrifugal blower chamber (51) has an air outlet (54), as shown in FIGS. 4 and 8, for throwing back heated air at high pressure. As apparent to any skilled in the art, a centrifugal blower, as the ones shown in FIG. 2, is used and mounted in each blower chamber (51) for drawing and blowing back the air.

As best shown in FIGS. 5 and 8, the convection system further comprises plenum chambers (60, 61, 62, 63), each in open communication and downstream from a respective blower chamber (51) to reinject heated air back into the baking chamber (12). More preferably, the convection system comprises a first set of two plenum chambers (60,61) disposed one over the other in between the baking chamber (12) and the heating chamber (30) on a first side of the oven (10). The upper one of these two plenum chambers (60,61) is downstream from the upper one of the centrifugal blower chamber (51) mounted in the blower housing (50) located on the same side as the first set of plenum chambers (60,61) and the lower one of the two plenum chambers (60,61) is downstream from the lower one of the blower chamber (51). The convection system comprises also a second set of two plenum chambers (62,63) located on the other side of the oven (10). Each of the plenum chambers (60,61,62,63) has an air inlet (64) in open communication with the air outlet (54) of a corresponding one of the centrifugal blower chambers (51) for receiving the heated air at high pressure, and air outlets (64) for throwing back the heated air. Preferably, the air outlet (54) of the blower chamber (51) and the air inlet (64) of the plenum chambers are in direct communication, and thus, in the drawings, these two numeral references (54) and (64) point to the same space.

As best viewed from FIG. 4, each plenum chamber (60,61, 62, 63), viewed from the top, has a substantially triangular shape tapering towards the center of the oven (10) and the vertical deflector (40) is extending in between the two sets of plenum chambers.

The convection system further comprises ducting means disposed within the baking chamber (30) for conveying the heated air at high pressure exiting from the plenum chambers (60,61,62,63) and dispensing the same in the baking chamber (12) to cook food. The ducting means could be any ducting means already known in the prior art. However, the ducting means used in the preferred embodiment illustrated is preferably similar to the one disclosed in U.S. Pat. No. 6,192,877 in the name of the applicant and which is incorporated herein by reference. More specifically, a set of blown air distributors in the form of finger ducts (70), as described in U.S. Pat. No. 6,192,877, are mounted in parallel over and below each conveyor (18). Each finger duct (70) has an air inlet (72) in open communication with a corresponding one of the plenum chambers (60,61,62,63) to receive heated air therefrom and a plurality of air outlets (74) in open communication with the baking chamber (12) and directed towards its respective conveyor (18) to impinge jets of heated air for cooking food on the conveyor.

Referring now more particularly to FIGS. 4 and 9 to 11, each set of finger ducts (70) is mounted in parallel on a single plate (76) removable from the baking chamber (12), as shown in FIG. 10, where the two lower plates are shown slightly removed. The single plate (76) has opposite side edges (78) slidably receivable in a guide way provided on a corresponding side wall (16) of the baking chamber (12). The plate (76) is also provided with a plurality of air inlets (44) which are the air inlets of the air return passages (42) to receive the air from the baking chamber (12) and drawn by the blower chambers (51), thereby providing a communication between the baking chamber (12) and the blower chambers (50).

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A multiconveyor convection oven, comprising
a baking chamber
at least two spaced-apart conveyors mounted transversally one over the other in the baking chamber;
a heating chamber behind the baking chamber, the heating chamber comprising an air heater to heat air circulating in the heating chamber;
a convection system for providing a circulation of the air from the baking chamber to the heating chamber and back to the baking chamber to cook the food, the convection system comprising:
  at least one air return passage having an air inlet in fluid communication with the baking chamber and an air outlet in fluid communication with the heating chamber;
  a blower housing extending vertically outside the heating chamber on a side thereof;
  at least two centrifugal blower chambers, one for each conveyor, mounted one over the other within the blower housing, each centrifugal blower chamber having:
    an air inlet in fluid communication with the heating chamber for drawing air from the baking chamber via the at least one air return chamber and the heating chamber; and
    an air outlet for throwing back heated air at high pressure;
  at least two plenum chambers, one downstream from each centrifugal blower chamber, disposed one over the other in between the baking chamber and the heating chamber, each plenum chamber having:
    an air inlet in fluid communication with the air outlet of a corresponding one of said centrifugal blower chambers for receiving said heated air at high pressure; and
    at least one air outlet for throwing back said heated air;
  ducting means disposed within the baking chamber for conveying the heated air at high pressure exiting from said at least one outlet of the plenum chamber and dispensing the same in the baking chamber to cook food.

2. A multiconveyor convection oven as claimed in claim 1, comprising:
control means for controlling the distribution of the heated air dispensed in the baking chamber.

3. A multiconveyor convection oven as claimed in claim 2, wherein the air heater comprises a burner capable of releasing a gas jet.

4. A multiconveyor convection oven as claimed in claim 3, wherein the burner is disposed in a bottom portion of the heating chamber, and the control means comprises a substantially transversal deflector mounted transversally within the heating chamber above the burner for controlling the distribution of the heat within the heating chamber between the bottom portion and the top portion of the heating chamber.

5. A multiconveyor convection oven as claimed in claim 4, comprising two of said blower housings, one extending on a first side of the heating chamber and the other one extending on a second side of the heating chamber opposite the first side.

6. A multiconveyor convection oven as claimed in claim 5, wherein the control means comprises a substantially vertical deflector mounted vertically within the heating chamber and facing the burner, and capable of controlling the distribution of the heat within the heating chamber between the first side and the second side thereof.

7. A multiconveyor convection oven as claimed in claim 4, wherein the transversal deflector is arc-shaped.

8. A multiconveyor convection oven as claimed in claim 7, wherein the transversal deflector is adjustable.

9. A multiconveyor convection oven as claimed in claim 8, wherein the transversal deflector comprises an arc-shaped middle section and at least one planar section connectable to each end of the middle section to transversally adjust the deflector.

10. A multiconveyor convection oven as claimed in claimed 1, wherein the ducting means comprises:
    a set of parallel finger ducts disposed over and/or below each of said at least two conveyors, each finger duct having an air inlet connectable to a corresponding one of said air outlets of the plenum chambers to receive the heated air therefrom and a plurality of air outlets to dispense the heated air in the baking chamber.

11. A multiconveyor convection oven, comprising:
    a baking chamber;
    two spaced-apart conveyors mounted transversally one over the other in the baking chamber;
    a heating chamber behind the baking chamber, the heating chamber comprising an air heater to heat air circulating in the heating chamber;
    a convection system for providing a circulation of the air from the baking chamber to the heating chamber and back to the baking chamber to cook the food, the convection system comprising:
        at least one air return passage having an air inlet in fluid communication with the baking chamber and an air outlet in fluid communication with the heating chamber;
        at least one blower housing extending vertically outside the heating chamber on a side thereof;
        two centrifugal blower chambers mounted one over the other within the at least one blower housing, each centrifugal blower chamber having:
            an air inlet in fluid communication with the heating chamber for drawing air from the baking chamber via the at least one air return chamber and the heating chamber; and
            an air outlet for throwing back heated air at high pressure;
        two plenum chambers, one downstream from each one of said two centrifugal blower chambers, disposed one over the other in between the baking chamber and the heating chamber, each plenum chamber having:
            an air inlet in open communication with the air outlet of a corresponding one of said centrifugal blower chambers for receiving said heated air at high pressure; and
            air outlets for throwing back said heated air;
    ducting means disposed within the baking chamber for conveying the heated air at high pressure exiting from said at least one outlet of the plenum chamber and dispensing the same in the baking chamber to cook food.

12. A multiconveyor convection oven as claimed in claim 11, comprising:
    control means for controlling the distribution of the heated air dispensed in the baking chamber.

13. A multiconveyor convection oven as claimed in claim 12, wherein the air heater comprises a burner capable of releasing a gas jet.

14. A multiconveyor convection oven as claimed in claim 13, wherein the burner is disposed in a bottom portion of the heating chamber, and the control means comprises a substantially transversal deflector mounted transversally within the heating chamber above the burner for controlling the distribution of the heat within the heating chamber between the bottom portion and the top portion of the heating chamber.

15. A multiconveyor convection oven as claimed in claim 14, comprising:
    two of said at least one blower housing, one extending on a first side of the heating chamber and the other one extending on a second side of the heating chamber opposite the first side.

16. A multiconveyor convection oven as claimed in claim 15, wherein the control means comprises a substantially vertical deflector mounted vertically within the heating chamber and facing the burner, and capable of controlling the distribution of the heat within the heating chamber between the first side and the second side thereof.

17. A multiconveyor convection oven as claimed in claim 14, wherein the transversal deflector is arc-shaped.

18. A multiconveyor convection oven as claimed in claim 17, wherein the transversal deflector is adjustable.

19. A multiconveyor convection oven as claimed in claim 18, wherein the transversal deflector comprises an arc-shaped middle section and at least one adjustable planar section connectable to each end of the middle section to adjust the deflector.

20. A multiconveyor convection oven as claimed in claim 11, wherein the ducting means comprises:
    a set of parallel finger ducts disposed over and/or below each of said two conveyors, each finger duct having an air inlet connectable to a corresponding one of said air outlets of the plenum chambers to receive the heated air therefrom and a plurality of air outlets to dispense the heated air in the baking chamber.

21. A multiconveyor convection oven, comprising:
    a baking chamber;
    two spaced-apart conveyors mounted transversally one over the other in the baking chamber;
    a heating chamber behind the baking chamber, the heating chamber comprising a burner disposed in a bottom portion of the heating chamber and capable of releasing a gas jet to heat air circulating in the heating chamber;
    a convection system for providing a circulation of the air from the baking chamber to the heating chamber and back to the baking chamber to cook the food, the convection system comprising:
        at least one air return passage having an air inlet in fluid communication with the baking chamber and an air outlet in fluid communication with the heating chamber;
        two blower housings extending vertically outside the heating chamber, one extending on a first side of the oven and the other one extending on a second side of the oven opposite the first side;
        two centrifugal blower chambers mounted one over the other within each of said two blower housings, each centrifugal blower chamber having:
            an air inlet in fluid communication with the heating chamber for drawing air from the baking chamber via the at least one air return chamber and the heating chamber; and
            an air outlet for throwing back heated air at high pressure;

a first set of two plenum chambers, one plenum chamber being downstream from each centrifugal blower chamber mounted in one of said two blower housings, said two plenum chambers being disposed one over the other in between the baking chamber and the heating chamber;

a second set of two plenum chambers, one plenum chamber being downstream from each centrifugal blower chamber mounted in the other one of said two blower housings, said two plenum chambers being disposed one over the other in between the baking chamber and the heating chamber;

each of said plenum chambers having:
  an air inlet in open communication with the air outlet of a corresponding one of said centrifugal blower chambers for receiving said heated air at high pressure; and
  air outlets for throwing back said heated air;

a set of parallel finger ducts disposed over and below each of two of said conveyors, each finger duct having an air inlet connectable to a corresponding one of said air outlets of the plenum chambers to receive the heated air therefrom and a plurality of air outlets to dispense the heated air in the baking chamber; and control means for controlling the distribution of the heated air dispensed in the baking chamber, the control means comprising:
  a substantially transversal deflector mounted transversally within the heating chamber above the burner for controlling the distribution of the heat within the heating chamber between the bottom portion and the top portion of the heating chamber, the transversal deflector comprising:
    an upwardly curved middle section; and
    at least one adjustable planar section connectable to each end of the middle section to adjust the deflector; and
  a substantially vertical deflector mounted vertically within the heating chamber and facing the burner, and capable of controlling the distribution of the heat within the heating chamber between the first side and the second side thereof.

* * * * *